P. DANCKWARDT.
METHOD FOR PRODUCING ZINC CHLORID.
APPLICATION FILED JUNE 23, 1919.
1,378,219. Patented May 17, 1921.
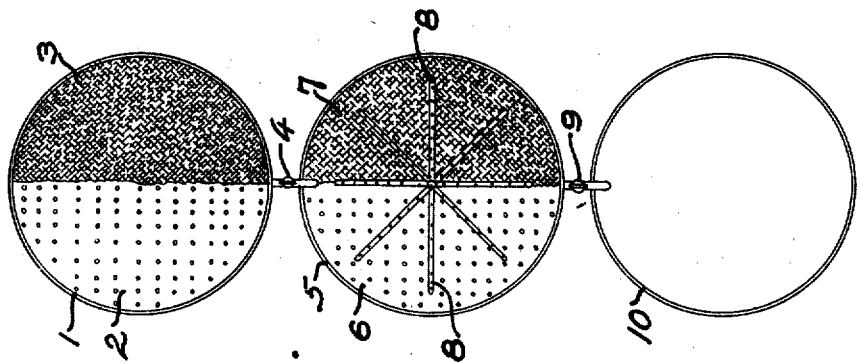
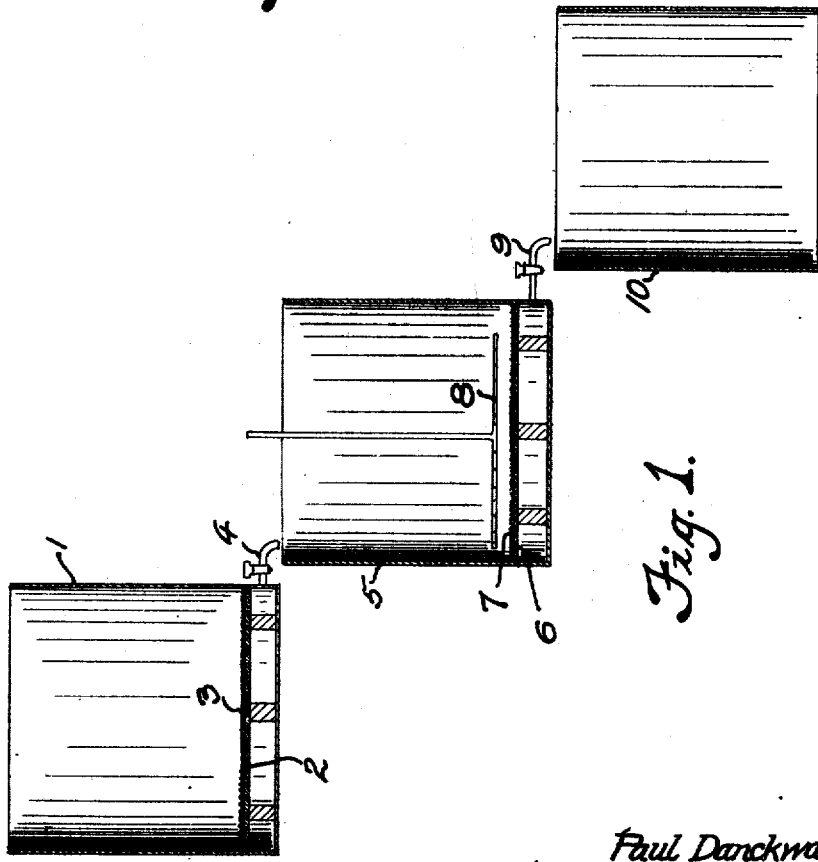
Inventor
Paul Danckwardt.

UNITED STATES PATENT OFFICE.

PAUL DANCKWARDT, OF DENVER, COLORADO, ASSIGNOR TO THE DANCKWARDT PROCESS COMPANY, OF DENVER, COLORADO, A CORPORATION OF COLORADO.

METHOD FOR PRODUCING ZINC CHLORID.

1,378,219.   Specification of Letters Patent.   Patented May 17, 1921.

Application filed June 23, 1919. Serial No. 306,182.

*To all whom it may concern:*

Be it known that I, PAUL DANCKWARDT, a citizen of the United States, residing at the city and county of Denver and State of Colorado, have invented certain new and useful Improvements in Methods for Producing Zinc Chlorid; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to manufacture zinc chlorid in a cheap way by utilizing a waste product of the oil industry in connection with zinc ore. The process yields aluminum oxid as a by-product. The waste product mentioned is a residue obtained from the treatment of oils with anhydrous aluminum chlorid and may be either in the raw state, as it is left in the bottom of the oil stills and known as "sludge", or in the form of cake, remaining after the sludge has been heated and run down so far as to drive out the small amount of oil which it may still contain.

This process, briefly, consists in leaching the residue, either as sludge or cake, as stated, with water, whereby a water solution of the aluminum chlorid of the residue is obtained. This solution is removed from the insoluble part by filtering. The filtrate is then treated with zinc ore in such proportion that all of the chlorin of the aluminum chlorid will combine with zinc, forming zinc chlorid, the aluminum being precipitated in the form of oxid. The aluminum oxid is separated by filtering off the chlorid solution and anhydrous zinc chlorid may then be obtained by evaporating and fusing the residue.

The process may be carried on with any suitable apparatus, one example of which is shown in the accompanying drawing, in which:

Figure 1 represents a vertical section through the apparatus; and

Fig. 2 is a plan thereof with portions of the filter cloth broken away.

A tank 1 is provided with a perforated, false bottom 2, covered with a filter cloth 3. A spigot or faucet 4 is provided on the tank, whereby solution may be drawn therefrom into a similar tank 5, which is in turn provided with a perforated bottom 6 and a filter cloth 7. Perforated radiating pipes 8 are mounted in this tank, slightly above the bottom, for the introduction of steam into the tank.

The tank 5 is also provided with a spigot 9, for drawing off solution into a tank 10.

It is obvious that other apparatus may be used, for instance, a set of plain tanks in conjunction with filter presses.

The tank 1 is filled with the residue from the oil process, and water is run thereover to dissolve the aluminum chlorid contained therein. When the aluminum chlorid has been dissolved, the solution is drained off through spigot 4 into the tank 5. All traces of aluminum chlorid may be removed from the residue in tank 1 by means of a wash of fresh water, this being drawn off and reserved separately from the solution first taken off to be used for leaching a new portion of residue in a subsequent treatment.

After tank 5 has been filled with solution from tank 1, steam is turned on and introduced into the solution by means of the perforated pipes 8, and finely ground zinc ore is poured into the solution. By thus heating and agitating the mixture, zinc chlorid and aluminum oxid are formed. If the ore used is in the form of high grade pure zinc oxid, carbonate or sulfid, the aluminum oxid precipitated will be pure and the solution will contain pure zinc chlorid. The reactions resulting from the use of these ores may be expressed by the following equations:

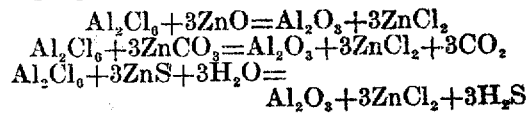

$$Al_2Cl_6 + 3ZnO = Al_2O_3 + 3ZnCl_2$$
$$Al_2Cl_6 + 3ZnCO_3 = Al_2O_3 + 3ZnCl_2 + 3CO_2$$
$$Al_2Cl_6 + 3ZnS + 3H_2O = Al_2O_3 + 3ZnCl_2 + 3H_2S$$

If the ore is unclean, most of the impurities go into the precipitate. However, lead, calcium and magnesium will pass into solution. The quantity of ore to be added must be calculated from the aluminum chlorid content of the solution, and that of the ore from its zinc oxid content, using the above reactions as the basis of computation. For instance, in the case of roasted zinc ore, consisting practically of pure zinc oxid, 244 pounds of zinc ore must be added for every 125 pounds of aluminum chlorid contained in the solution. When the reaction is complete, the steam is shut off and the contents of the tank are allowed to settle, whereupon the solution is drawn off through spigot 9 into tank 10. The aluminum oxid remaining on the filter cloth 7 in the tank 5 may then be washed with fresh water to remove all traces of zinc chlorid, and this may be reserved separately to be used in the treatment of a subsequent batch of residue, as is the wash water from the treatment in tank 1.

In order to obtain anhydrous zinc chlorid from the solution in tank 10, the latter is evaporated, in a suitable pan or vessel, capable of withstanding a red heat, since the last traces of water are difficult to remove, and this can be done only at a high temperature. The zinc chlorid can thus be obtained as a molten mass and may be poured into molds. It should be packed well if not used immediately, since it is deliquescent.

The solid part remaining on the filter in tank 5 when dried and ignited, yields pure $Al_2O_3$, if pure materials have been used. However, as ore often contains, even when concentrated, varying amounts of gangue, mostly silicates, these impurities will be found in the residue. However, the aluminum oxid, unless very impure, has considerable value and forms a valuable by-product.

It is to be understood that where the term "zinc oxid" is used in the claims, the chemical equivalents of zinc oxid, such as zinc carbonate and zinc sulfid, are considered to be included.

I claim:

1. A process of producing zinc chlorid, which consists in treating a solution of aluminum chlorid with a zinc oxid, separating the precipitated aluminum oxid by filtering from the zinc chlorid solution, evaporating the filtrate and fusing the residue.

2. A process of treating oil residues containing aluminum chlorid, which comprises leaching the residues to remove the aluminum chlorid in solution, filtering off the solution, treating the filtrate with a zinc oxid to obtain zinc chlorid and aluminum oxid, and separating the oxid from the chlorid.

3. The process of treating oil residues obtained from treating oils with aluminum chlorid, which comprises leaching the residues to remove the aluminum in solution, filtering off the solution, treating the filtrate with a zinc oxid to obtain zinc chlorid and aluminum oxid, filtering off the zinc chlorid solution, evaporating the same to dryness, and fusing the residue from evaporation.

4. The process of producing zinc chlorid, which consists in leaching the aluminum chlorid from the residues obtained from the treatment of natural oils with anhydrous aluminum chlorid, adding to the solution of aluminum chlorid a substance containing zinc oxid, separating the precipitate from the resulting solution of zinc chlorid, evaporating the solution to dryness, and fusing the residue resulting from evaporation.

5. The process of producing zinc chlorid, which consists in leaching with water the residue from the aluminum chlorid process of oil distillation, removing the aluminum chlorid solution from the residue, adding to said solution of aluminum chlorid zinc oxid to precipitate aluminum oxid and produce a solution of zinc chlorid, filtering the zinc chlorid solution from the aluminum oxid, evaporating said solution and fusing the residue resulting therefrom.

In testimony whereof I affix my signature.

PAUL DANCKWARDT.